US 6,557,660 B2

(12) United States Patent
Averill et al.

(10) Patent No.: US 6,557,660 B2
(45) Date of Patent: May 6, 2003

(54) HUB LOCK FOR TWO-WHEEL/FOUR-WHEEL DRIVE VEHICLE

(75) Inventors: Bryan M. Averill, Portland, OR (US); Kip E. Clohessy, Milwaukie, OR (US); John R. Dupree, Gresham, OR (US); Fred L. Ewer, Clackamas, OR (US); Mark J. Fogelberg, Milwaukie, OR (US); Randy C. Karambelas, Milwaukie, OR (US); Peter A. Lines, Portland, OR (US); Peter J. Pugliese, Portland, OR (US)

(73) Assignee: Warn Industries, Inc., Clackamas, OR (US)

( * ) Notice: Subject to any disclaimer, the term of this patent is extended or adjusted under 35 U.S.C. 154(b) by 0 days.

(21) Appl. No.: 09/975,724

(22) Filed: Oct. 10, 2001

(65) Prior Publication Data

US 2003/0066701 A1 Apr. 10, 2003

(51) Int. Cl.⁷ .............................................. B60K 23/08
(52) U.S. Cl. ..................... 180/247; 180/253; 192/69.41
(58) Field of Search ................................ 180/247, 253, 180/245, 246, 255, 256, 254, 233; 192/69.41, 69.91

(56) References Cited

U.S. PATENT DOCUMENTS

| 4,466,503 A | 8/1984 | Hans |
| 4,537,270 A | 8/1985 | Brandenstein |
| 5,333,939 A | 8/1994 | Krude |
| 5,494,129 A | 2/1996 | Krude |
| 5,536,075 A | 7/1996 | Bertetti |
| 5,740,895 A | 4/1998 | Bigley |
| 5,853,250 A | 12/1998 | Krude |
| 5,974,665 A | 11/1999 | Frielingsdorf |
| 6,012,986 A | 1/2000 | Guimbretiere |
| 6,022,275 A | 2/2000 | Bertetti |
| 6,109,411 A | 8/2000 | Bigley |
| 6,170,628 B1 | 1/2001 | Bigley |
| 6,203,441 B1 | 3/2001 | Iarrera |
| 6,234,289 B1 | 5/2001 | Baker |
| 6,318,492 B1 * | 11/2001 | Goddard et al. ............ 180/247 |
| 6,318,533 B1 * | 11/2001 | Krisher .................... 192/69.41 |
| 6,336,537 B1 * | 1/2002 | Krisher et al. ............... 192/43 |
| 6,371,268 B1 * | 4/2002 | McMorris et al. ....... 192/69.41 |
| 6,390,221 B2 * | 5/2002 | Goddard et al. ............ 180/247 |
| 6,422,369 B1 * | 7/2002 | McCalla ................. 192/69.41 |

OTHER PUBLICATIONS

Article from Modern Automotive Technology by James E. Duffy Goodheart–Wilcox, 1994—pp. 780, 783 and 784.

* cited by examiner

Primary Examiner—Lesley D. Morris
Assistant Examiner—Tony Winner
(74) Attorney, Agent, or Firm—Robert L. Harrington; Schwabe Williamson & Wyatt

(57) ABSTRACT

An assembly for converting a vehicle between two-wheel and four-wheel drive. The assembly includes a bell form of a constant velocity joint being supported by a bearing mounted to one of the vehicle knuckle and the wheel hub. The bell form further includes a collar that has a connector, and a spindle of the wheel hub has a connector in close proximity to the bell form connector. A clutch ring actuated by an actuator is moved by the actuator between engagement with one of the connectors and engagement with both of the connectors.

17 Claims, 11 Drawing Sheets

HUB LOCK FOR TWO-WHEEL/FOUR-WHEEL DRIVE VEHICLE

FIELD OF THE INVENTION

This invention relates to vehicles that are convertible between two-wheel and four-wheel drive and more particularly to a mechanism that connects and disconnects front axles from the front wheels.

BACKGROUND OF THE INVENTION

Drive line connection to the front wheels is particularly distinguished from that of the rear wheels due to the front wheels also functioning as turning wheels. To achieve turning of the front wheels, the wheel hubs are rotatably mounted to a steering knuckle which is pivotally mounted to the fixed frame of the vehicle. The steering knuckle of the two front wheels are tied together by tie rods and the tie rods are engaged by a control mechanism that is manipulated by the vehicle's driver to direct the vehicle in a desired direction.

To achieve front wheel drive, a drive line has to be connected to the front wheels without impairing the turning capability of the front wheels. This is accomplished by the provision of a drive line extended to a front end differential from which axles are laterally extended to a bell form or bell of a continuous velocity joint at the inboard side of the knuckle. The bell form which is rotatably driven by the front axle is also pivotal about the same axis as the steering knuckle. Thus, connection of the bell form with the wheel will produce driving of the wheel while also enabling the wheel and bell form to be turned via manipulation of the steering or tie rod.

It is the connection between the bell form and the front wheels to which the present invention is directed.

A prior construction for obtaining this connection included a stub-axle formed integral with the bell form, the stub-axle extended through the knuckle with bearings between the knuckle and stub-axle supporting the axle and maintaining axial alignment of the stub-axle. The stub-axle continued through the wheel hub where it was rotatably fixed (spline fit) to the wheel hub. The end of the stub-axle protruded through the wheel hub which end was threaded and a nut secured to the threaded end to axially secure the stub-axle to the wheel hub. Another prior construction included a spindle integral with the wheel hub and extended inwardly through the knuckle where it was rotatably supported by bearings. A stub-axle (again integral with the bell form) extended through the spindle and wheel hub. The stub-axle was fixed rotatively to the wheel hub by splines and a protruded end received a lock nut to secure the wheel hub and stub-axle together. That it will be appreciated that the components of the wheel end assembly including the CV joint, the stub axle, the knuckle and the wheel hub are all coupled in a desired relation (for axial and radial rotation).

It is desirable for many applications to convert the front wheels from driven (four-wheel drive) to non-driven (two-wheel drive). This is accomplished for the above structures by providing additional bearing support between the stub-axle and wheel hub. A clutch ring having splines that couple with both the wheel hub and stub-axle is selectively axially moved (automatically or manually) to couple and uncouple the wheel hub and axle to accomplish conversion between four-wheel and two-wheel drive.

A further development occurred for the convertible versions where the wheel hub is provided with a spindle that is bearing supported in the knuckle. The stub-axle is extended into but not through the spindle and wheel hub and bearing supported therein, the stub-axle being axially secured to the spindle to secure the entire assembly together. Rotative engagement of the bell form to the wheel hub is accomplished by clutch ring engagement between the bell form and the spindle at the inboard end of the spindle. (See U.S. Pat. No. 5,740,895).

The next development of wheel end assembly was the elimination of the stub-axle. In this later version, the bell form and wheel hub spindle are locked together for common rotation and the combination is bearing mounted to the knuckle in a manner that prevents axial movement. (See U.S. Pat. Nos. 5,853,250, 6,012,986 and 6,022,275) The latest development does not provide for selective engagement/disengagement for conversion between two-wheel and four-wheel drive. Accordingly, it is an objective of the present invention to provide front wheel drive to a wheel end assembly that eliminates the necessity of the stub-axle while maintaining the advantage of the integrated wheel end system of the '895 patent (in providing selective coupling of the wheel hub to the bell form).

BRIEF DESCRIPTION OF THE INVENTION

In the present invention, there are two separate bearing mounts, one for the wheel hub/spindle assembly, and the other for the bell form assembly. The bearings are mounted so as to provide rotative motion as between both of these components and the knuckle, and to enable relative rotation as between the wheel hub/spindle assembly and bell form assembly. The bearings are assembled to the structure to prevent relative axial movement. A coupling mechanism selectively connects or disconnects the wheel hub and spindle with the bell form.

The above combination is subject to numerous variations as will become apparent upon reference to the following detailed description and illustration of a number of examples, including preferred embodiments.

DETAILED DESCRIPTION OF THE PREFERRED EMBODIMENT

Figure 1:
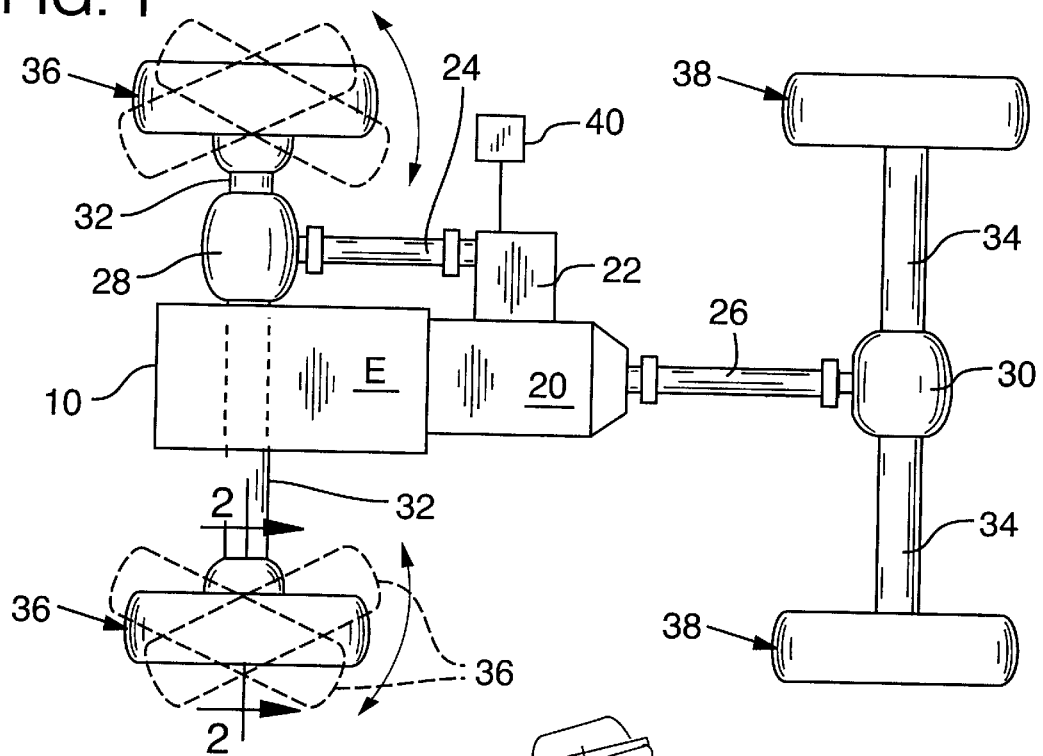
FIG. 1 is a schematic illustration of a vehicle chassis having permanent rear wheel drive and selective front wheel drive.

FIG. 1 illustrates schematically a vehicle chassis including an engine E, a transmission 20, a transfer case 22 and front and rear propellor shafts 24, 26 connected to front and rear differentials 28, 30 connected to front and rear axles 32, 34 that engage front and rear wheels 36, 38.

A shift mechanism 40 provided for the transfer case 22 connects driving rotation or disconnects driving rotation from the engine E to propellor shaft 24 and thus to axles 32 and wheels 36. It is desirable to also disconnect the wheels 36 from the axles 32 when the shift mechanism 40 disconnects driving power from the engine. Otherwise the mechanism including propellor shaft 24, differential 28 and axles 32 will be driven by wheels 36 (in contact with the road) resulting in undesired power loss and drive line wear. The invention is accordingly directed to the mechanism that connects/disconnects the axles 32 from the wheels 36.

Figure 2:
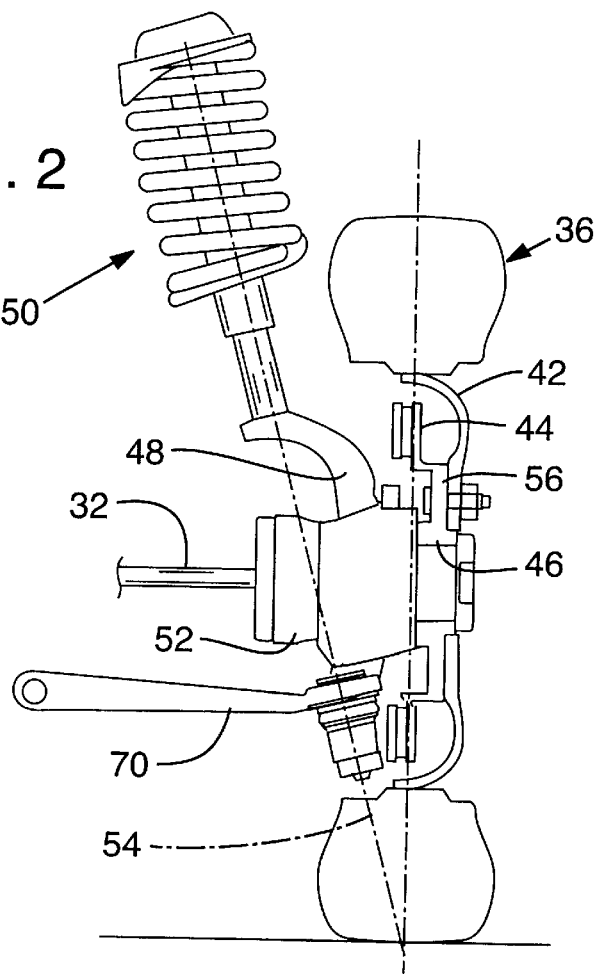
FIG. 2 is a section view as if taken on view lines 2—2 of FIG. 1 illustrating the assembly of the wheel end whereat the present invention is incorporated.

FIG. 2 illustrates somewhat schematically a wheel end assembly including a wheel 36, wheel rim 42, a brake rotor 44 and wheel hub 46. The wheel hub is rotatably mounted to a knuckle 48 carried by a suspension structure 50. Reference 52 in FIG. 2 schematically illustrates a constant velocity joint (sometimes referred to as a CV joint) which forms a part of the axle 32 and rotates with rotation of the axle 32. The CV joint permits pivotal steering of the front wheels 36 indicated by arrows and dash lines in FIG. 1, the axis around which the wheels pivot being indicated by reference 54 in FIG. 2.

Figure 3:
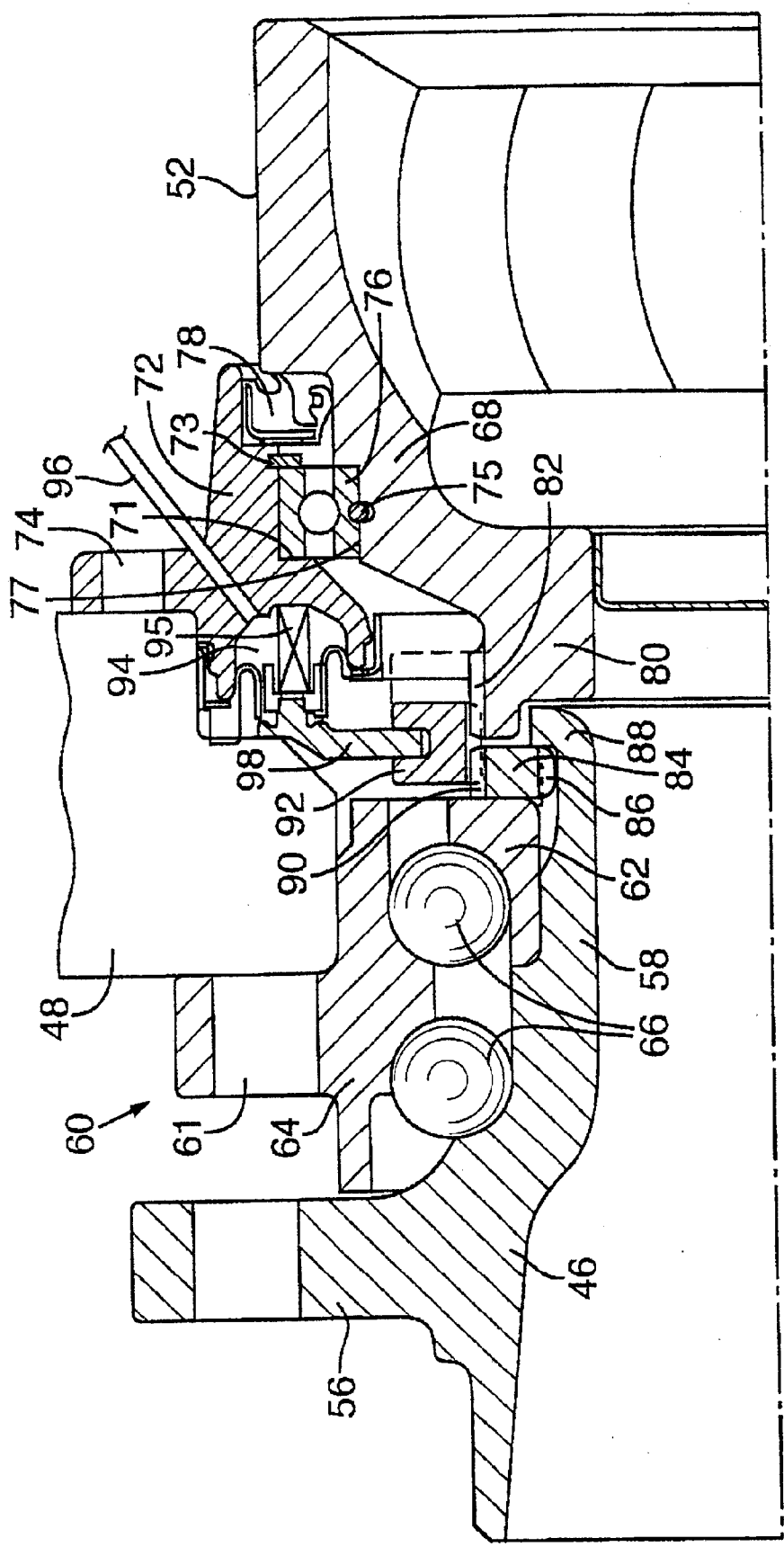
FIG. 3 is a sectional view in part of the assembly of FIG. 2 illustrating a first embodiment of the invention.

FIG. 3 illustrates a first preferred embodiment of the invention. The wheel hub 46 includes a hub flange 56 (shown in both FIGS. 2 and 3) which flange is bolted to the wheel rim 42 as shown in FIG. 2. Extended inwardly (to the right in FIG. 3) from hub flange 56 is a hub portion that will be hereafter referred to as a spindle or spindle portion 58. The spindle 58 is rotatably mounted in knuckle 48 (which circumscribes the spindle) by bearing pack 60 (the outer race 69 of which is bolted to the knuckle via bolt hole 61) including an inner race 62, and ball bearings 66 (a portion of spindle 58 functions as a part of the inner race as illustrated).

It will be understood that only the outboard portion of CV joint 52 is shown in FIG. 3 which is referred to as the bell form or bell 68 of the CV joint, i.e., the portion that pivots to allow steering. The steering action is generated by a steering rod indicated at reference 70 in FIG. 2 which pivots the knuckle 48 and thus the wheel 36 and bell 68 around axis 54.

As discussed above, the pivotal bell form 68 and the wheel hub and spindle 46/58 must be axially fixed and rotatable relative to the knuckles whereas the bell form and wheel hub spindle are selectively rotatable relative to the knuckles and relative to each other. In the illustrated embodiment of FIG. 3, an actuator housing 72 is fixedly mounted to the knuckle 48 (note bolt hole 74, the bolt for securement not being shown) and the bell form 68 is mounted to the housing 72 by bearing 76. A seal 78 protects against dirt and other contaminants from entering between the rotating bell 68 and rotatably fixed actuator 72. The bearing 76 is axially fixed relative to the housing 72 (and thus the knuckle 48) by shoulder 71 and retaining ring 73 which axially secures the outer race of bearing 76 to housing 72. A expanding retaining ring 75 axially secures the inner race of bearing 76 to a cylindrical surface 77 of the bell form 68.

At the outboard end of bell form 68, a collar portion 80 is configured to have external splines 82 formed on the periphery of collar portion 80. A coupler 84 is mounted in rotatably fixed relation to the end of spindle 58 (note splines 86) and is press fit against inner race 62 and axially secured to the wheel hub by the roll forming of end 88.

The coupler 84 has external splines 90 that are mated or matched to splines 82 of collar portion 80. A clutch ring 92 is slidable along splines 82 of collar 80 and into (the solid line position) and out of (the dash lines position) engagement with splines 90 of coupler 84. The clutch ring 92 is moved between the two positions (into and out of engagement) by a pneumatic actuator including an air chamber 94 connected through air lines 96 to an air pressure source, e.g., negative air pressure from the vehicle's intake manifold (not shown). Controlled evacuation of air from air chamber 94 in conjunction with compression spring 95 selectively expands and contracts air chamber 94 to move fork 98 axially inwardly and outwardly which is engaged with and thus positions the clutch ring 92. A bearing connection between the fork 98 and clutch ring 92 permits rotation of the clutch ring 92 relative to the fork 98 in a manner well known to the industry.

It will thus be observed that the mechanism for connecting and disconnecting the steerable wheel hub 46 of wheel 36 to the CV joint of drive axle 32 is accomplished without the conventional stub-axle. The bell form 68 of the CV joint is rotatably mounted to the knuckle 48 (via bearing 76 and housing 72) and the clutch ring 92 connects/disconnects the bell form 68 to the wheel hub spindle 58 of wheel hub 46.

Figure 4:
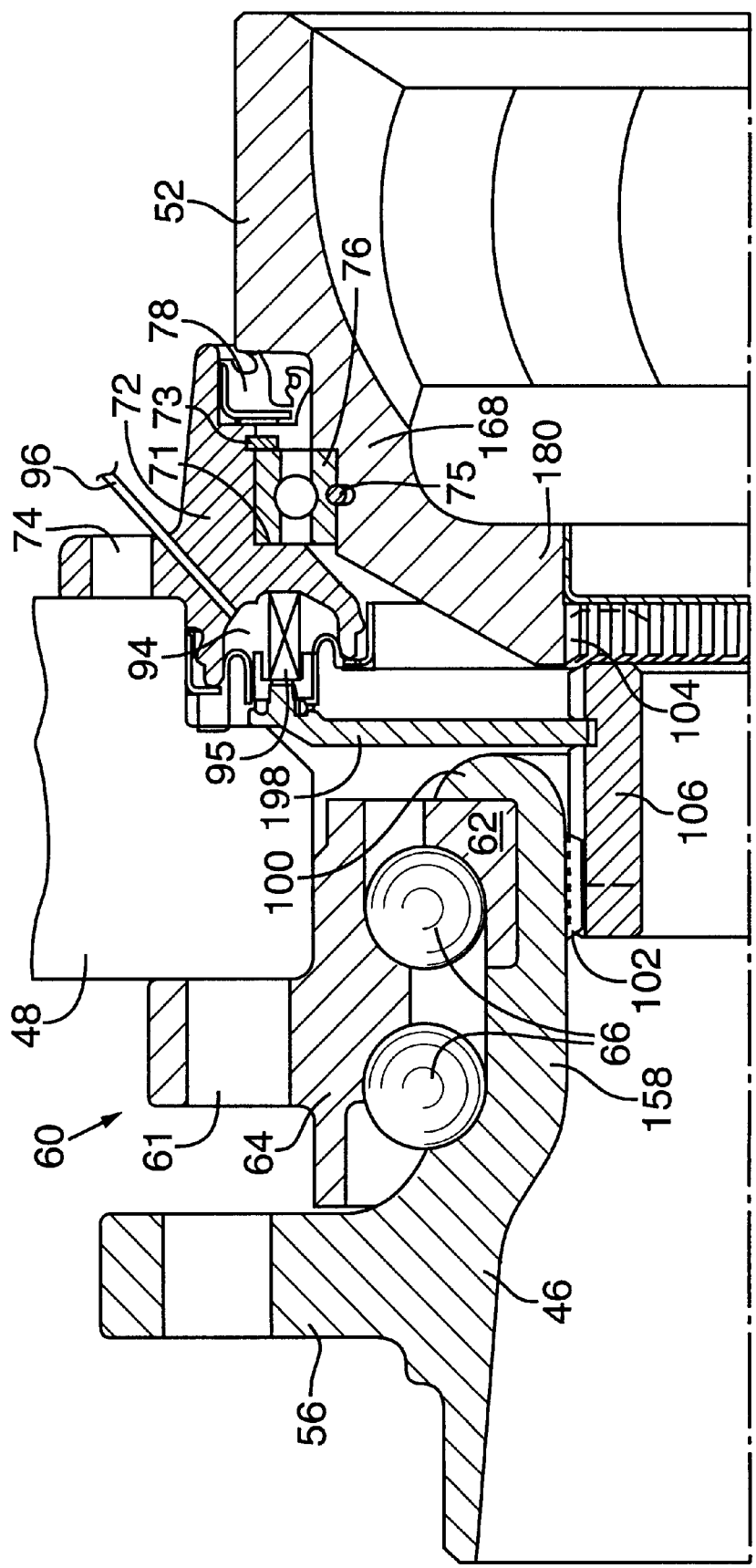
FIGS. 4–12 are views similar to that of FIG. 3, each illustrating a further embodiment of the invention.

FIG. 4 illustrates a further embodiment of the invention. This embodiment is similar to FIG. 3 in a number of respects and the features that are common are identified by the same reference numbers. (This will be the case with a number of subsequent embodiments, i.e., similar components are similarly numbered.) In FIG. 4, the end 100 of spindle 158 is roll formed directly against inner race 62 and internal splines 102 are formed on the interior circumference of spindle 158. Collar 180 of bell 168 is provided with mated internal splines 104. A clutch ring 106 is slidably engaged to splines 102 and is slidable into engagement with splines 104. The actuator (72, 94, 95) controls movement of the clutch ring 106 through movement of fork 198 in the manner described for FIG. 3.

Figure 5:
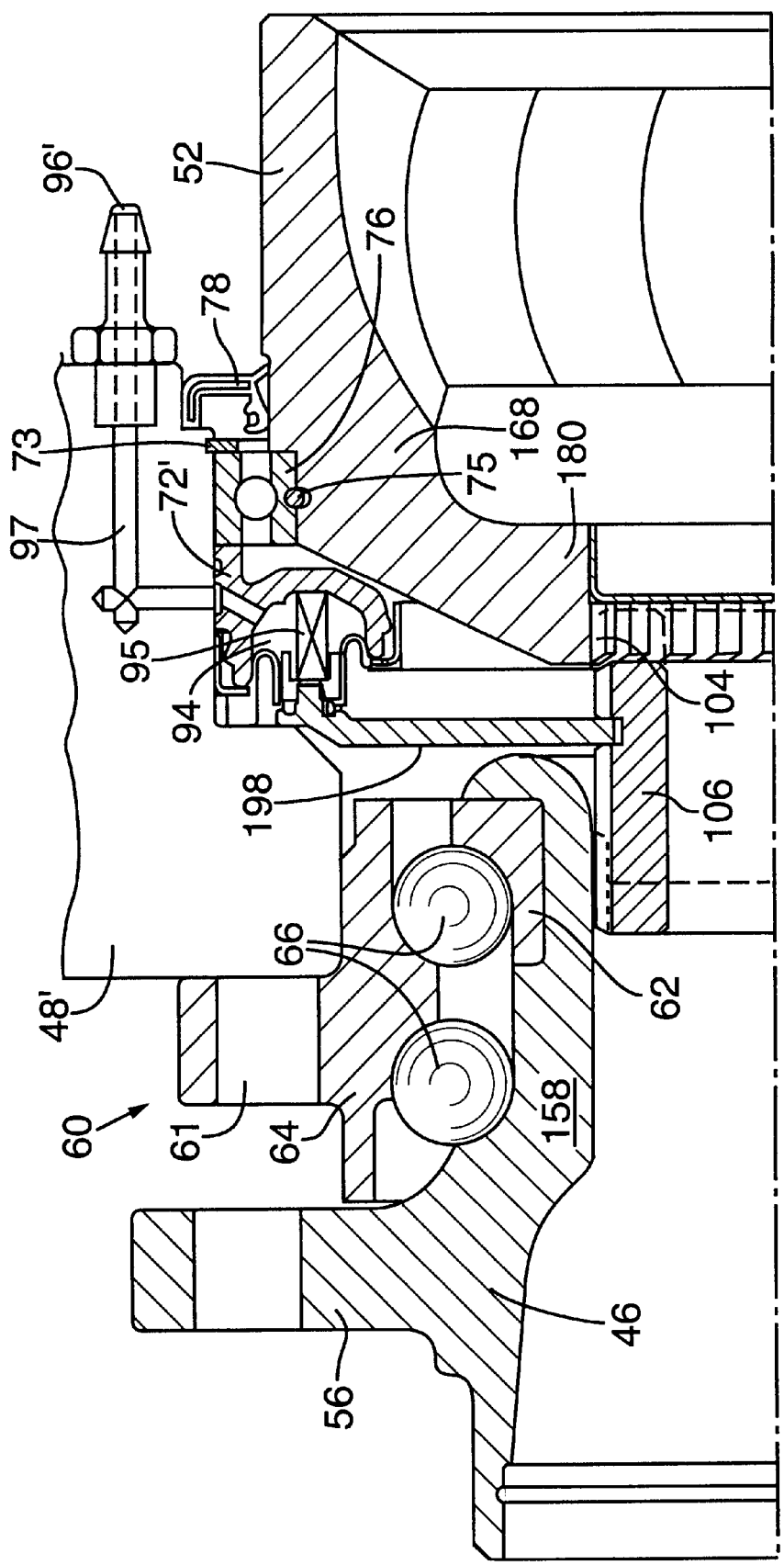

FIG. 5 is essentially the same embodiment as FIG. 4 but shows the invention applied to a differently configured knuckle 48'. The bell form 168 is bearing mounted directly to the knuckle 48', as shown and the air line 96' is connected into an internal passage 97 in the knuckle and then through the actuator housing 72' and into chamber 94.

Figure 6:
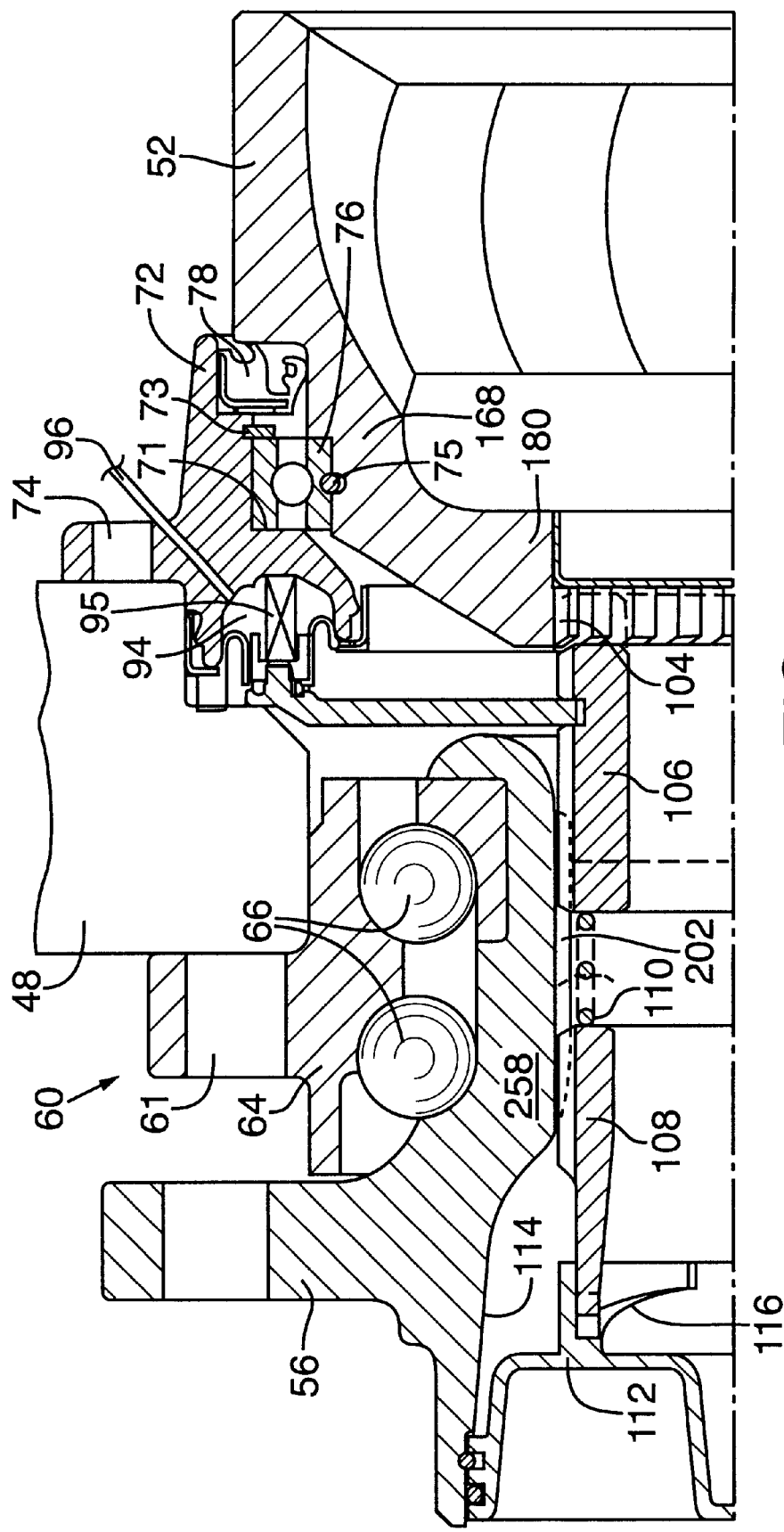

FIG. 6 illustrates a further modification to FIG. 4. In FIG. 6 splines 202 of spindle 258 are extended axially outward relative to splines 102 of FIG. 4 and receive at the outboard end a cylindrical cam follower 108. A spring 110 is positioned between cam follower 108 and clutch ring 106. A camming dial 112 is mounted in the hub end cavity 114. Camming surfaces 116 on the dial 112 force inward movement of cam follower 108 against spring 110 to urge axially inward movement of clutch ring 106 which induces engagement of the clutch ring 106 with splines 104 on the bell form 168. Such urging by compressed spring 110 overcomes the counter urging of spring 95 in the actuator to produce engagement.

The FIG. 6 embodiment thus provides a dual method for engagement, i.e., pneumatic engagement by the application of negative pressure in air chamber 94 or manual engagement by manual turning of the dial 112. Disengagement is produced by spring 95 when the negative air pressure is vented to atmosphere and the manual dial 112 is in the retracted position.

Figure 7:
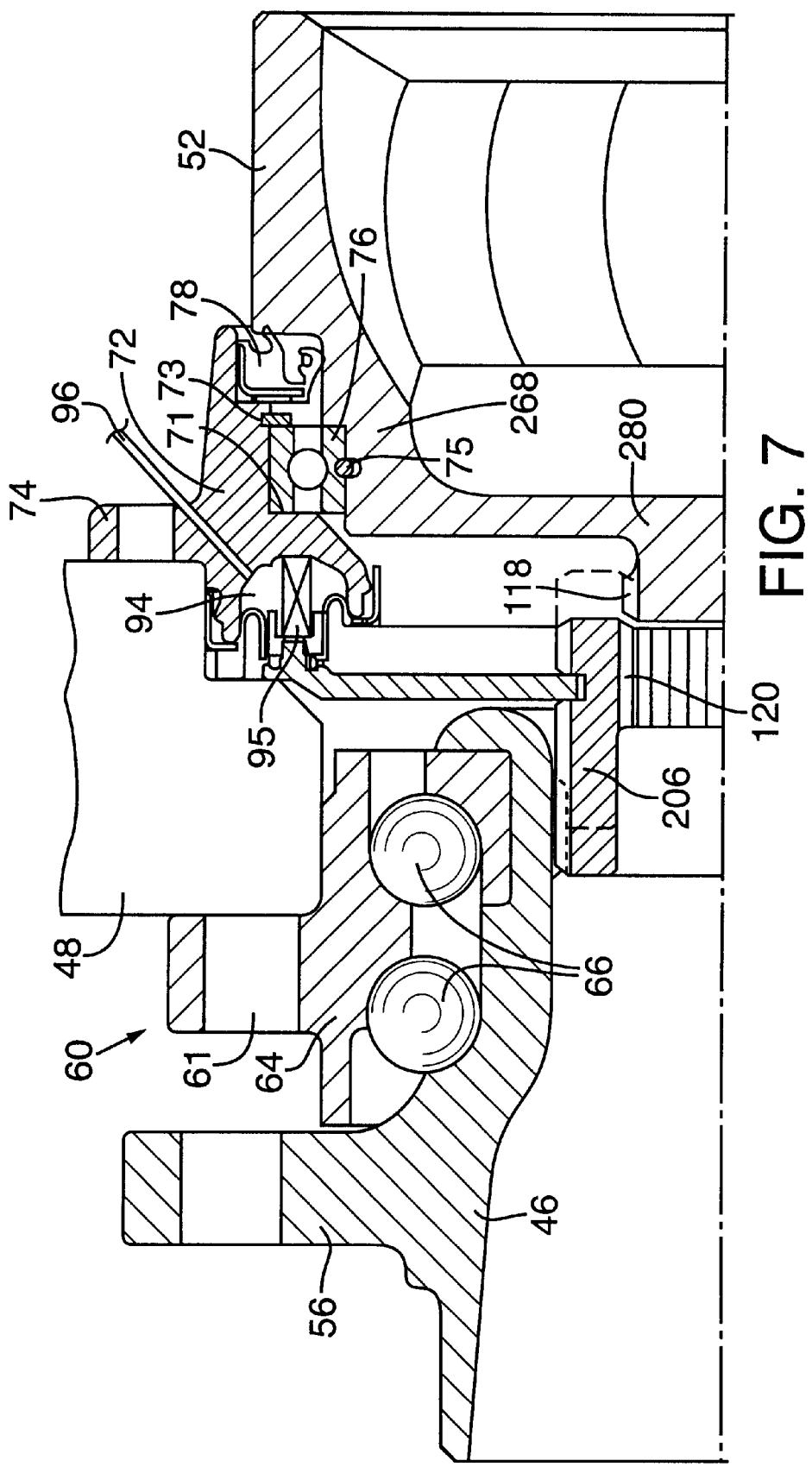

FIG. 7 is a modification of FIG. 4 wherein the bell form 268 is configured to have collar 280 with external splines 118 provided on an outer periphery of collar 280 with clutch ring 206 having internal splines 120 that mate with splines 118.

Figure 8:
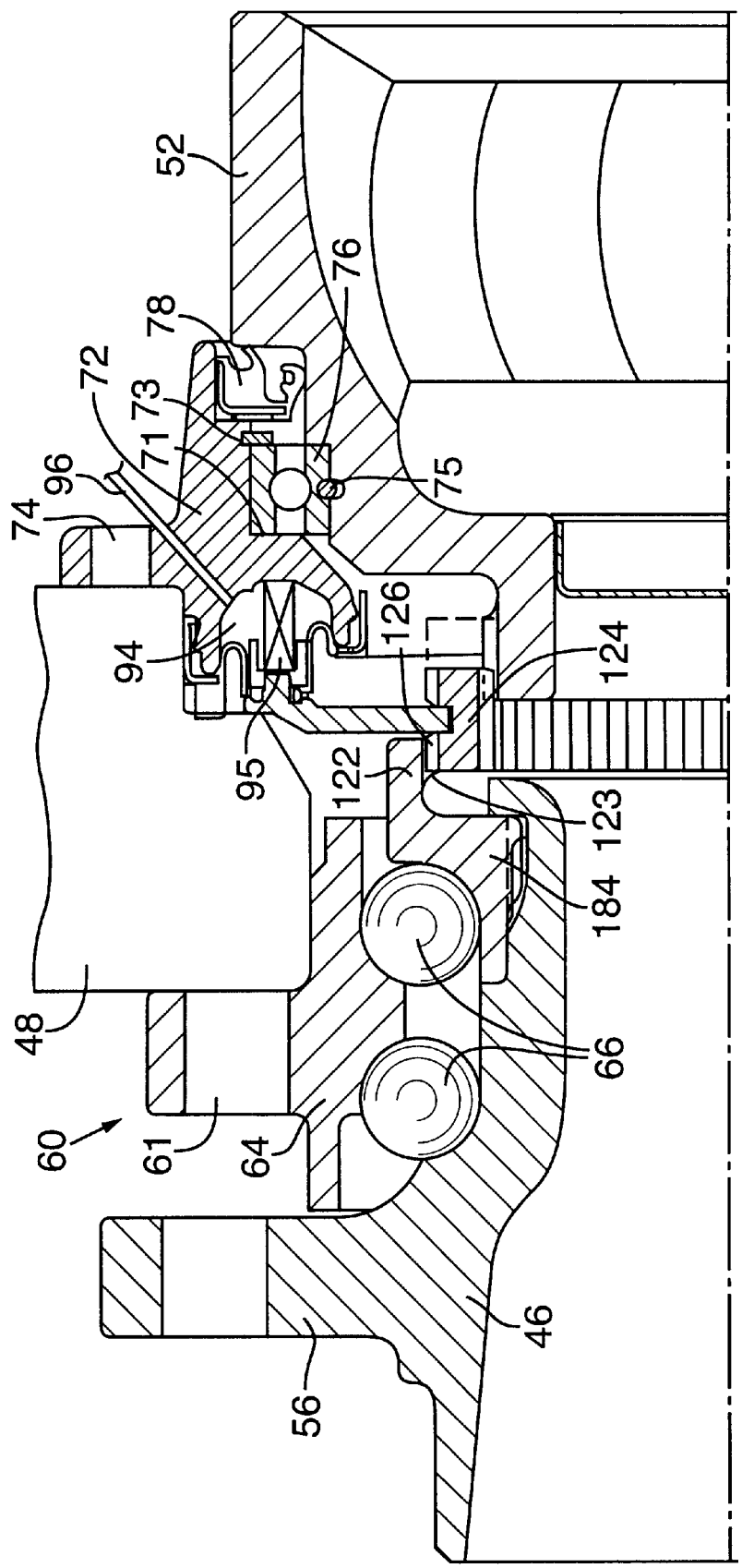

FIG. 8 is similar to FIG. 3 but with a modified coupler portion 122 forming a part of the inner race 184. The coupler portion 122 has internal splines 123 and clutch ring 124 is provided with mated external splines 126. All of the components of FIG. 8 (and the operations thereof) are otherwise similar to that of FIG. 3.

Figure 9:
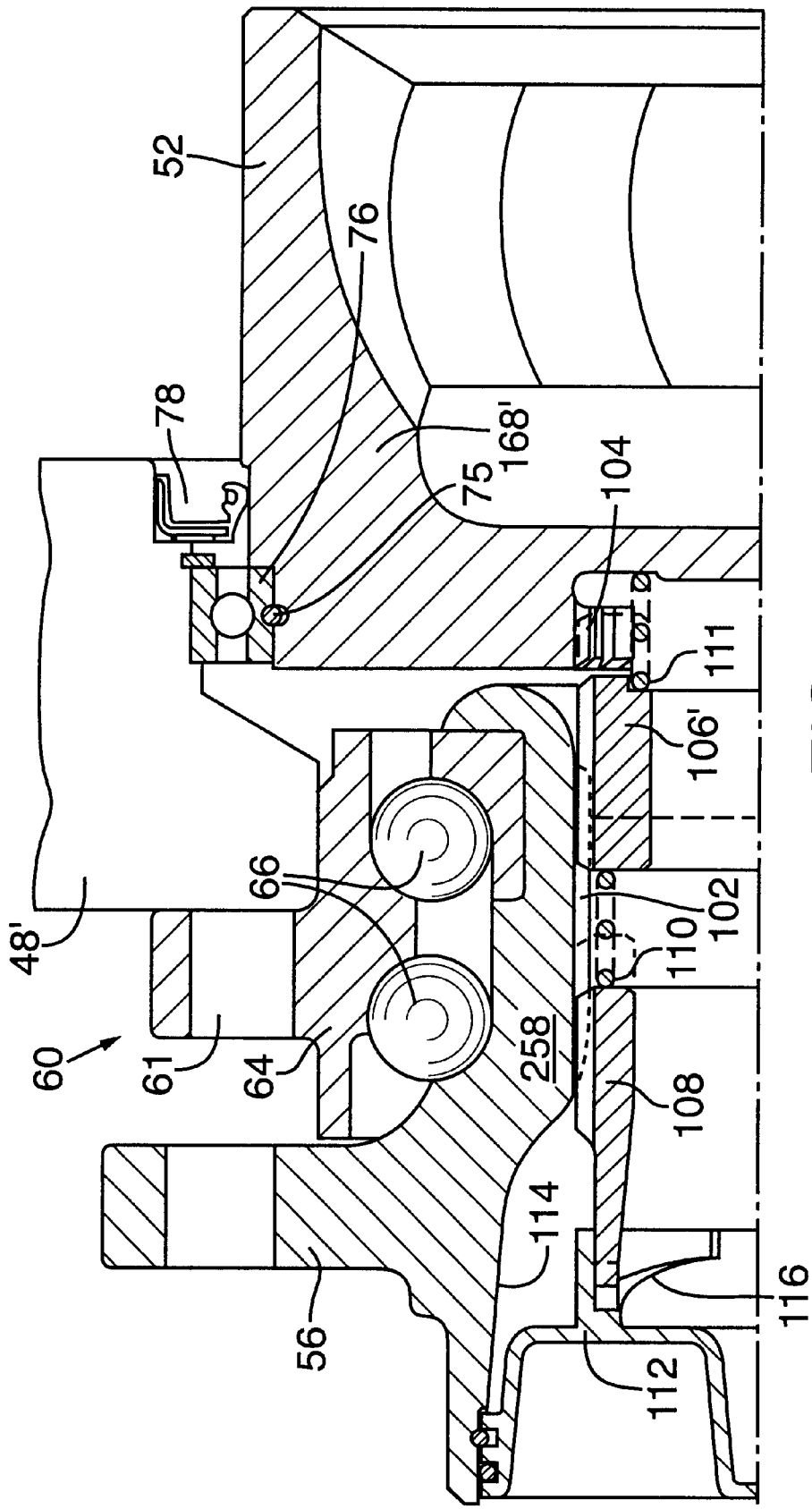

FIG. 9 is a manual version only of a connect/disconnect mechanism that is similar to prior embodiments, with reference made particularly to FIG. 6. The actuator mechanism is removed whereas the manual mechanism portion of FIG. 6 is retained. Thus, dial 112 is turned to produce camming action of cam 116 against cam follower 108 which is spline fit to the spindle 258, thus producing axial movement of the cam follower 108 to compress spring 110. This urges the clutch ring 106' toward splines 104 of the bell form 168'. This movement is resisted by spring 111 but is nevertheless overcome to enable clutch ring connection to the bell form 168'. Reverse turning of the dial 112 relaxes spring 110 to permit spring 111 to urge disconnection of the clutch ring 106' from the bell form 168'.

Figure 10:
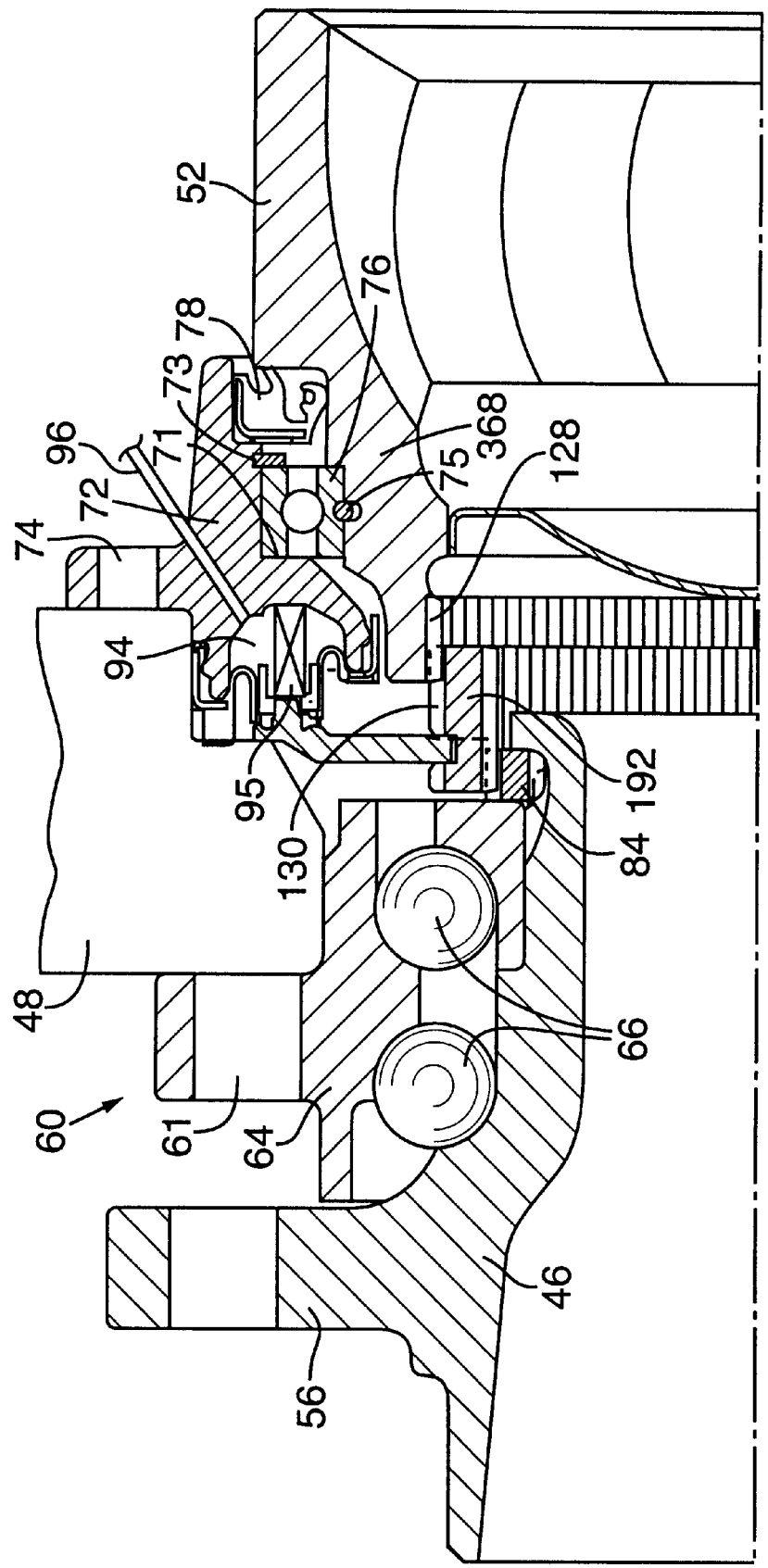

The embodiment of FIG. 10 resembles FIG. 3 except that internal splines 128 are provided on an interior circumference of bell form 368 and the clutch ring 192 has matching external splines 130. The clutch ring 192 and coupler 84 are otherwise provided with the spline connection of FIG. 3.

Figure 11:
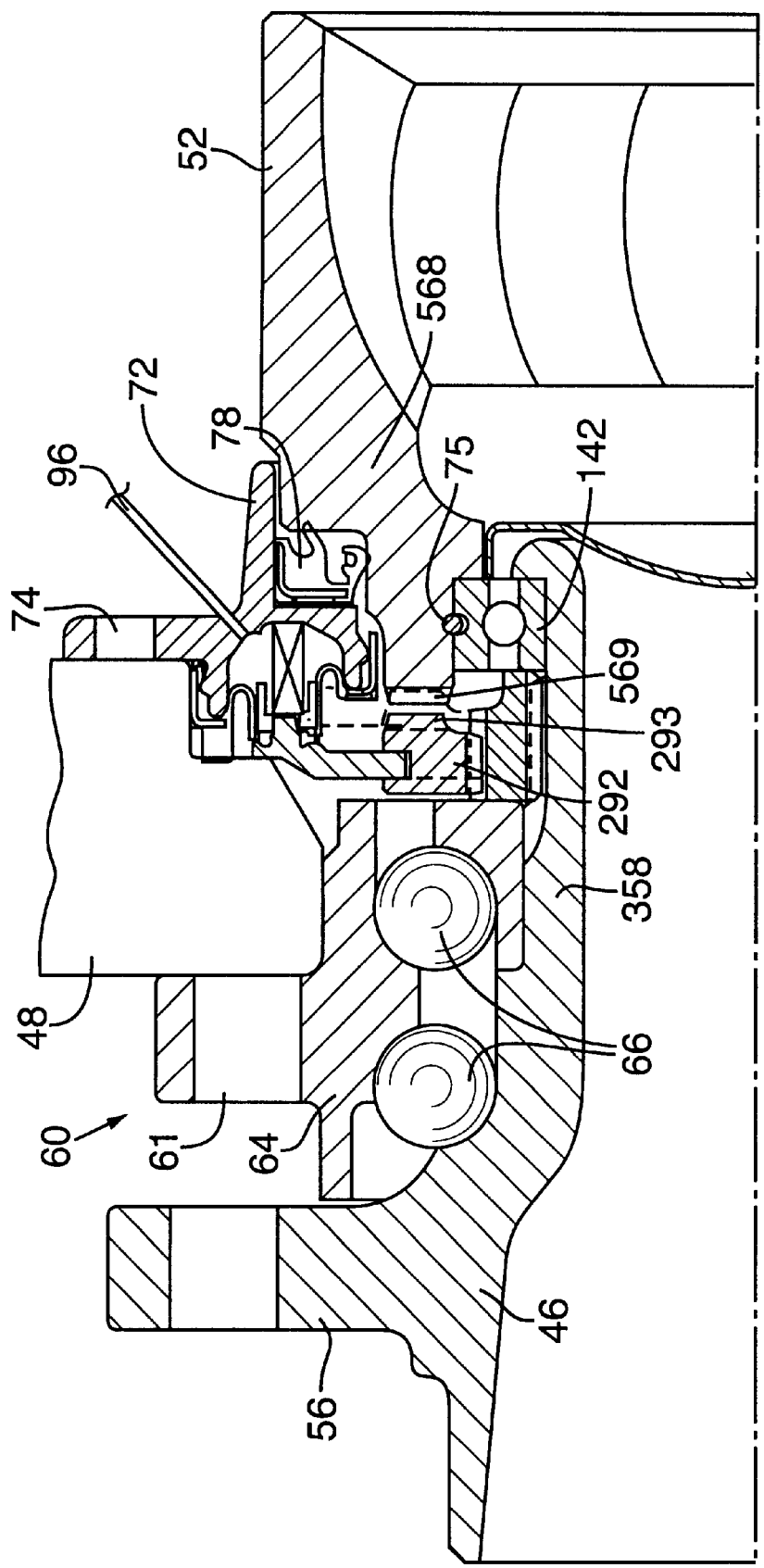

FIG. 11 is similar to FIG. 10 except the spindle 358 is further extended axially inwardly and provided with a bearing 142 that is secured by roll forming the inboard end of the spindle. The bell form 568 is supported by the bearing 142 and thus by spindle 358 as differentiated from the actuator housing/knuckle of prior embodiments. The clutch ring 292 has radially extended dog clutch teeth 293 that engage matching teeth 569 of the bell form for connecting the wheel and axle.

Figure 12:
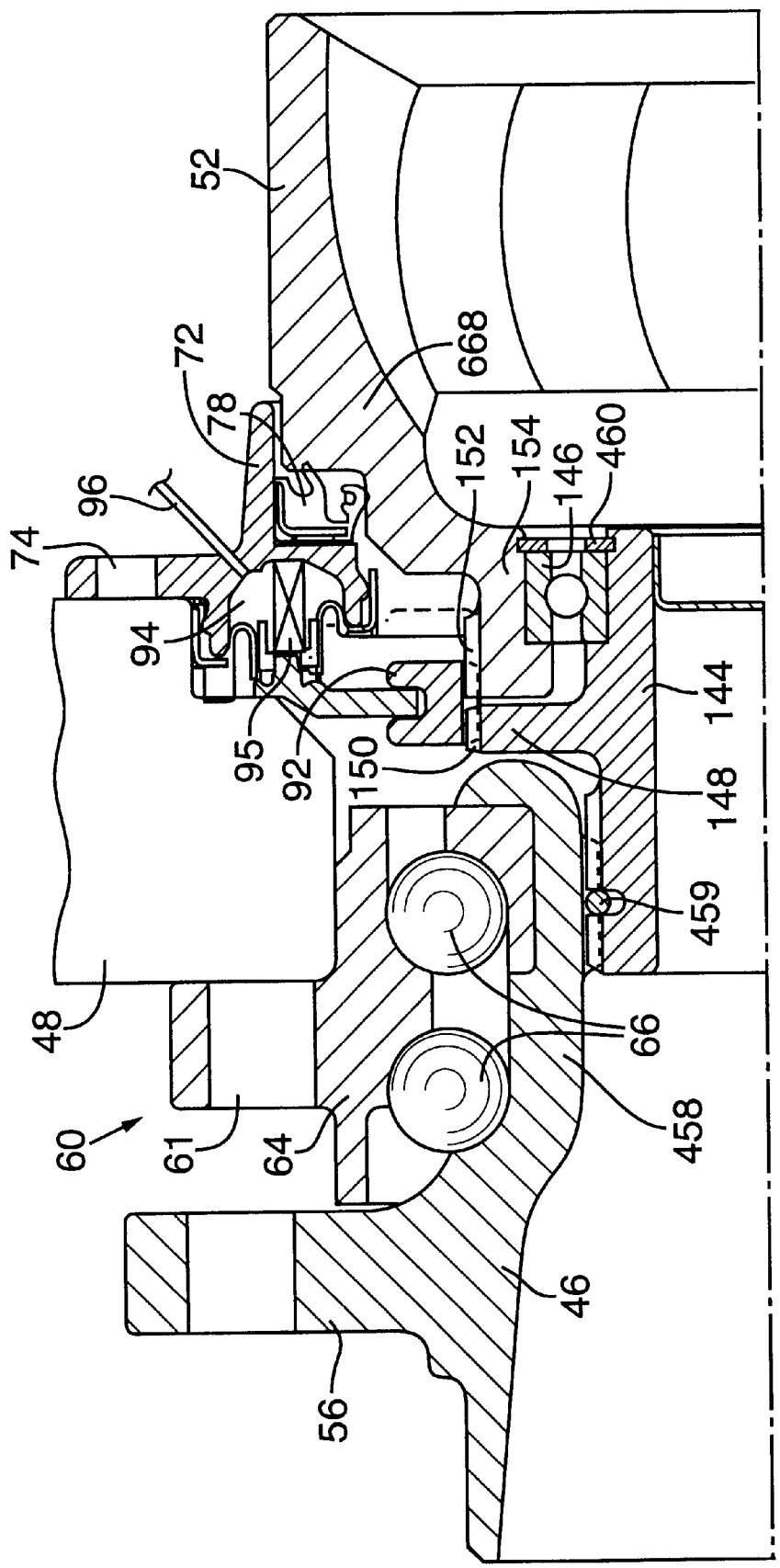

FIG. 12 illustrates an embodiment where a coupler 144 is fixedly secured via expanding retaining ring 459 to the spindle 458 at the interior circumference thereof. The coupler 144 is extended to a position at the interior of the bell form 668 and supports the bell form via bearing 146. A flange portion 148 of coupler 144 includes external splines 150 mated or matched to external splines 152 on a collar portion 154 of bell form 668. The clutch ring 92 connects and disconnects the splines 150, 152 as previously described, to engage and disengage the bell form and axle relative to the spindle portion 458 of the wheel hub. The bearing 146, similar to the prior embodiments axially secures the components (retaining rings 460 and 462) while permitting three-part relative rotation, i.e., the rotation of both the spindle and bell form relative to the knuckle 48 and relative to each other.

The above illustrates a number of embodiments but not all embodiments. As will be appreciated, all of the embodiments have eliminated the stub-axle normally associated with the outboard bell form portion of the CV joint. All embodiments provide rotatable support for the bell form, directly or indirectly, on one of the knuckle and wheel spindles. All provide sliding clutch ring engagement directly or indirectly between the bell form and spindle.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

The invention claimed is:

1. An assembly for connecting and disconnecting each of a pair of front steerable wheels of a vehicle from front wheel axles comprising:

a rotatable wheel hub for receiving a front wheel;

a steering knuckle forming a part of a vehicle chassis and having a circumferential opening there through;

a bell form forming a part of a constant velocity universal joint provided on an outboard end of a front wheel axle;

a spindle portion provided on said wheel hub and extended axially inwardly through the circumferential opening of said steering knuckle, and a first bearing between said spindle portion and said knuckle for rotatably mounting said spindle and wheel hub to said knuckle;

said bell form configured to have a cylindrical surface adjacent a portion of one of said spindle portion and said knuckle, and a second bearing between said cylindrical surface of said bell form and said one of said spindle portion and said knuckle, and said bell form having an outboard collar portion, an inboard end portion of said spindle portion adjacent said outboard collar portion, and a clutch ring slidably engaged with one of said inboard end portion of said spindle portion and said outboard collar portion, and slidably engageable with the other of said inboard end portion and said outboard collar portion; and an actuator connected to said clutch ring that selectively axially moves the clutch ring into slidable engagement and out of slidable engagement with said other of said inboard end portion and said outboard collar portion.

2. An assembly as defined in claim 1 wherein a coupler is provided as said inboard end portion of said spindle portion.

3. An assembly as defined in claim 2 wherein said collar portion of said bell form and said coupler have radially outwardly directed splines in mated relationship, said clutch ring having radially inwardly directed splines engaged and engageable with said bell form splines and coupler splines.

4. An assembly as defined in claim 1 wherein said second bearing is provided between said cylindrical surface of said bell form and an inboard portion of said knuckle.

5. An assembly as defined in claim 4 wherein said actuator is automatic and includes an air pressure chamber contained in a housing, said housing fixedly secured to and forming said inboard portion of said knuckle, said air pressure chamber expandable and contractible in response to air pressure, an air pressure source connected to said air pressure chamber and an axially movable fork that is axially moved in response to expansion and contraction of said air chamber, said fork rotatably connected to the clutch ring for axial movement of said clutch ring into and out of said engagement.

6. An assembly as defined in claim 1 wherein said inboard end portion of said spindle portion has an internal circumference configured to have radially inwardly directed splines and said collar portion has radially inwardly directed splines in mated relation to said splines of said spindle portion, said clutch ring in slidable engagement with said splines of said collar portion and spindle portion.

7. An assembly as defined in claim 6 wherein the splines of said spindle portion extend axially outward to an outboard position of said spindle portion and a cam follower is slidably engaged with the splines at said outboard position, a compression spring between said cam follower and said clutch ring for urging the clutch ring toward said splines of said collar portion, and a dial exposed to the outboard side of said wheel hub for manual turning, said dial having a cam surface that engages said cam follower and produces axially inward movement of said cam follower and compression of said spring against said clutch ring upon rotative movement of said dial.

8. An assembly as defined in claim 1 wherein said inboard end portion of said spindle portion has an internal circumference configured to have radially inwardly directed splines and said collar portion of said bell form has radially outwardly directed splines spaced radially inwardly from the splines of said spindle portion, said clutch ring having outwardly and inwardly directed splines for slidable engagement relative to said spindle portion and said collar.

9. An assembly as defined in claim 1 wherein said inboard end portion of said spindle portion is a coupler fixedly secured to the inboard end of said spindle portion, said coupler configured to have radially inwardly directed splines and said clutch ring having radially outwardly directed splines engageable with said splines of said coupler.

10. An assembly as defined in claim 9 wherein said collar portion is configured to have radially outwardly directed splines and said clutch ring having radially inwardly directed splines that engage said splines of said collar.

11. An assembly as defined in claim 1 wherein said inboard end portion of said spindle portion is a coupler fixedly secured to the inboard end of said spindle portion, said coupler configured to have radially outwardly directed splines and said clutch ring having radially inwardly directed splines engageable with said splines of said coupler, and said collar portion configured to have radially inwardly directed splines and spaced radially outward from said coupler, said clutch ring having radially outwardly directed splines that engage said splines of said collar.

12. An assembly as defined in claim 2 wherein said collar portion has axially outwardly directed dog lugs and said clutch ring has axially inwardly directed dog lugs engageable with said dog lugs of said collar portion upon movement of the clutch ring axially inwardly.

13. An assembly as defined in claim 12 wherein said second bearing is fixed to the outward end of the spindle portion and the bell form is accordingly rotatably supported by said wheel hub.

14. An assembly as defined in claim 1 wherein said spindle portion at the inward end has an inner circumference and a coupler spline fit to the inner circumference and providing said inboard end portion of said spindle portion, said coupler having a radially outwardly extended flange forming an outer spline surface for engagement by said clutch ring, said coupler having an axially inwardly extending portion, and said second bearing carried by said inwardly extending portion and providing bearing support between said bell form and said wheel hub.

15. An assembly as defined in claim 1 wherein said spindle portion is provided with radially inwardly directed splines and said clutch ring is slidably movable along the splines of said spindle portion for engagement and disengagement with said collar portion, and a cam follower slidably movable along the splines of said spindle portion outboard of said clutch ring, and a spring disposed between said clutch ring and cam follower to urge separation of said clutch ring and cam follower, and a dial exposed at the outer side of said wheel hub for manual actuation, said dial upon actuation engaging said cam follower and forcing inward movement of said cam follower, said cam follower compressing said spring and said spring urging engagement of said clutch ring with said collar.

16. An assembly as defined in claim 15 wherein said dial is rotated upon manual actuation thereof and includes a cam mechanism that converts the rotation to axial movement of said cam follower.

17. An assembly as defined in claim 16 wherein a second spring is disposed between said clutch ring and said bell form to urge disengagement of the clutch ring from said collar upon reverse rotation of said dial.

* * * * *

UNITED STATES PATENT AND TRADEMARK OFFICE
CERTIFICATE OF CORRECTION

PATENT NO. : 6,557,660 B2
DATED : May 6, 2003
INVENTOR(S) : Averill et al.

It is certified that error appears in the above-identified patent and that said Letters Patent is hereby corrected as shown below:

<u>Title page,</u>
Item [75], Inventors, "Peter J. Pugliese" should be -- Scott J. Pugliese --.

Signed and Sealed this

Twenty-third Day of March, 2004

JON W. DUDAS
*Acting Director of the United States Patent and Trademark Office*